United States Patent [19]

Buter

[11] Patent Number: 4,857,577
[45] Date of Patent: Aug. 15, 1989

[54] DISPERSION STABILIZER AND POLYMERIC AQUEOUS DISPERSION PREPARED THEREFROM

[75] Inventor: Roelof Buter, Ht Dieren, Netherlands

[73] Assignee: Akzo N.V., Arnhem, Netherlands

[21] Appl. No.: 8,680

[22] Filed: Jan. 28, 1987

[30] Foreign Application Priority Data

Jan. 28, 1986 [NL] Netherlands .................... 8600188

[51] Int. Cl.$^4$ ................................................. C08F 2/16
[52] U.S. Cl. .................................... 524/458; 524/460; 525/301
[58] Field of Search ................. 524/458, 460; 525/301

[56] References Cited

U.S. PATENT DOCUMENTS 4,381,365  4/1983  Mishiba et al. ...................... 524/460
4,413,073  11/1983  Gibson et al. ....................... 524/460
4,539,362  9/1985  Davies et al. ........................ 524/460
4,611,028  9/1986  Peng et al. ............................ 525/301

Primary Examiner—Joseph L. Schofer
Assistant Examiner—Peter D. Mulcahy
Attorney, Agent, or Firm—Jeffrey S. Boone

[57] ABSTRACT

The invention pertains to an aqueous dispersion of an acrylic polymer stabilized by a compound obtained by copolymerizing specific amounts of (1) styrene and/or methyl styrene, (2) (meth)acrylic acid and/or an amino group-containing (meth) acrylic ester, and optionally another comonomer, in the presence of a specific polybutadiene, the carboxylic acid groups and/or amino groups being at least partly ionized. The invention also pertains to a coating composition based on such aqueous dispersion and to a substrate coated with said coating composition. Finally, the invention also relates to a process for the preparation of the stabilizer of the aqueous dispersion of an acrylic polymer.

14 Claims, No Drawings

DISPERSION STABILIZER AND POLYMERIC AQUEOUS DISPERSION PREPARED THEREFROM

The invention relates to an aqueous dispersion of an addition polymer built up from an acrylate monomer and/or a methyacrylate monomer, which dispersion also contains a dispersion stabilizer in an amount of 5-100 percent by weight, based on the addition polymer. A dispersion of the type indicated above is prepared by a dispersion polymerization in which use is made of a reaction mixture consisting of one or more monomers and a dispersion stabilizer and during which polymerization the addition polymer formed separates from the reaction mixture.

The invention has for its object to provide a new stabilizer for the aqueous dispersion, as a result of which the polymeric micro particles are sterically stabilized and do not exhibit any flocculation, agglomeration or any other destabilization in the dispersion.

According to the invention the dispersion stabilizer is obtained by copolymerization of 100 parts by weight of a mixture consisting of 20-75 mole % of styrene and/or methyl styrene, 21-60 mole % of acrylic acid and/or methacrylic acid and/or an amino group-containing acrylic and/or methacrylic ester and 0-40 mole % of a different monethylenically unsaturated compound, in the presence of 40-200 parts by weight of polymer build up from at least 60 percent by weight of 1,3-butadiene and having a number average molecular weight of 1500-10,000, the carboxylic acid groups from the acylic acid and/or methacrylic acid and/or the amino groups from the amino group-containing acrylic and/or methacrylic ester being at least partly ionized.

As suitable acrylate monomers and/or methacrylate monomers from which the addition polymer to be dispersed is built up may be mentioned (cyclo)alkyl(meth-)acrylates of which the (cyclo)alkyl group contains 1-24 carbon atoms, such as methyl methacrylate, ethyl acrylate, ethyl methacrylate, propylmethacrylate, butyl acrylate, butyl methacrylate, 2-ethylhexyl acrylate, 2-ethylhexyl methacrylate, octyl acrylate, isobornyl acrylate, dodecyl acrylate, hexadecyl acrylate, oleyl acrylate and cyclohexyl acrylate. Optionally, the above-mentioned monomeric compound(s) may be mixed with one or more other, ethylenically unsaturated monomers such as hydroxy functional or epoxy functional (meth)acrylates; for instance: 2-hydroxyethyl acrylate, 2-hydroxyethyl methacrylate, 2-hyroxypropyl acrylate, 2-hydroxypropyl methacrylate and glycidyl methacrylate and/or monomers such as ethoxyethyl methacrylate, vinyl acetate, vinyl propionate, acrylonitrile, methacrylonitrile, styrene and α-methyl styrene.

Optionally, use may be made of small amounts (up to about 10% by weight, calculated on the monomer composition) of monomers which are polyfunctional with respect to the polymerization reaction. As examples of suitable polyfunctional monomers may be mentioned: allyl methacrylate, divinyl benzene, the reaction product of (meth)acrylic acid in glycidyl (meth)acrylate, trimethylol propane triacrylate, trimethylol propane diacrylate, trimethylol propane trimethacrylate, trimethylol propane dimethacrylate, 1,4-butane diol diacrylate, 1,4-butane diol dimethacrylate, 1,6-hexane diol diacrylate, 1,6-hexane diol dimethacrylate, pentaerythritol, triacrylate and pentaerythritol trimethacrylate. Use of a small amount of one or more of these polyfunctional monomers will result in entire or partial cross-linking of the polymer micro particles.

Polymerization of the monomers referred to above is carried out with the aid of a radical initiator, in the presence of 5-100 by weight (calculated on the weight of the monomers) of the stabilizer according to the invention, in water or in a mixture of water and at most 80% by weight of a volatile organic solvent which is miscible with water. On conclusion of the polymerization the organic solvent, if used, may partly or entirely be removed, for instance by distillation. In this way a stable, aqueous dispersion of the (meth)acrylate addition polymer with an average particle size of 100-250 nm is obtained. It is preferred that the organic solvent should be an alcohol having 1-4 carbon atoms, such as methanol, ethanol, isopropyl alcohol and/or butanol.

The polymerization reaction is preferably carried out under an atmosphere of an inert gas such as nitrogen and preferably under reflux using 0,1 to 5% by weight (calculated on the monomer) of a radical initiator such as an organic peroxide, for instance: dilauroyl peroxide, dibenzoyl peroxide, an azo compound, for instance: azobisisobutyronitrile; an inorganic peroxide, for instance, potassium persulphate or a mixture consisting of, for instance, a hydroperoxide, such as tert. butyl hydroperoxide, and a reducing agent such as sodium formaldehyde sulphoxylate or preferably ascorbic acid. The stabilizer to be used according to the present invention is a stabilizer obtained by polymerization of a specific monomer mixture in the presence of a polymer which is built up from at least 60 percent by weight of 1,3-butadiene (which polymer is referred to hereinafter as polybutadiene). This polymer is preferably built up from at least 80% percent by weight of 1,3-butadiene and an ethylenically unsaturated monomer such as styrene, acrylonitrile and/or isoprene. The number average molecular weight of the polybutadiene is preferably 2200-6000. The steric configuration of the polybutadiene may vary; for instance it may have a high cis-1,4 content, a high trans-1,4 content or a high 1,2 content, or a combination of 2 or 3 configurations. Optionally, the polybutadiene may have terminal hydroxyl groups and/or carboxyl groups.

According to the invention it is preferred that the monomer mixture to be used in the preparation of the dispersion stabilizer should consist of 35-65, more particularly 45-55 mole % of styrene and/or methyl styrene, 25-55, more particularly 30-50 mole % of acrylic acid and/or methacrylic acid and/or an amino group-containing acrylic ester and/or methacrylic ester and 0-40 mole % of a different monoethylenically unsaturated compound. By methyl styrene is to be understood here α-methyl styrene and ortho-, meta- or paramethyl styrene.

As suitable amino group-containing acrylic and/or methacrylic esters may be mentioned N,N-dimethylaminoethyl (meth)acrylate, N,N-diethylaminoethyl (meth)acrylate, N-tert.butylaminoethyl (meth)acrylate, N-cyclohexylaminoethyl (meth)acrylate, N-(2,4-dimethylcyclohexyl) aminoethyl (meth)acrylate, 2-pyridylethyl (meth)acrylate and the chloride or sulphate of trimethylammoniumethyl (meth)acrylate. It is preferred that use should be made of a dialkylamino (meth)acrylate of which the alkyl groups have 1-4 carbon atoms. More particularly, use is made of a β-dialkylaminoethyl (meth)acrylate of which the alkyl group have 1-4 carbon atoms, such as β-dimethylaminoethyl (meth)acrylate and β-diethylaminomethyl (meth)acrylate.

As examples of suitable monoethylenically unsaturated compounds which may be used besides the styrene and/or methyl styrene and the acrylic acid and/or methacrylic acid and/or an amino group-containing acrylic and/or methacrylic ester may be mentioned monovinyl aromatic hydrocarbons such as vinyl toluene and vinyl naphthalene; nitriles, such as acrylonitrile and/or methacrylonitrile; acrylic or methacrylic esters, such as methyl methacrylate, ethyl acrylate, 2-hydroxyethyl acrylate, 2-methoxyethyl methacrylate, 2-ethoxyethyl methacrylate, 2-hydroxyethyl methacrylate, glycidyl methacrylate, 2-hydroxypropyl methacrylate, butyl methacrylate, 4-hydroxybutyl acrylate, 6-hydroxyhexyl acrylate, p-hydroxycyclohexyl acrylate, 2-ethylhexyl acrylate, 8-hydroxyoctyl acrylate, n-dodecyl acrylate and n-hexadecyl acrylate; ethylenically unsaturated monocarboxylic acids such as crotonic acid and itaconic acid; and compounds such as vinyl chloride, vinyl acetate and vinyl propionate.

It is preferred that 100 parts by weight of the monomer mixture should be copolymerized in the presence of 50–150 parts by weight of the polybutadiene.

Copolymerization of the starting reaction mixture for the stabilizer according to the invention is generally carried out with the aid of a radical initiator in an amount of 0,1 to 10, preferably 2 to 8 percent by weight, calculated on the polybutadiene, in an organic solvent and at a temperature of 60° to 120° C., preferably 80° o 100° C., under an atmosphere of an inert gas, such as nitrogen. A preferred radical initiator is dibenzoyl peroxide or a substituted dibenzoyl peroxide. Examples of substituted dibenzoyl peroxides include di(2-methylbenzoyl) peroxide and di(2,4-dichlorobenzoyl)peroxide.

A preferred suitable organic solvent is a water-miscible organic solvent, more particularly an ether group-containing alcohol, such as propylene glycol monopropyl ether, propylene glycol monobutyl ether, propylene glycol mono-isopropyl ether, propylene glycol mono-isobutyl ether, diethylene glycol monobutyl ether and dipropylene glycol monomethyl ether. The stabilizer is with advantage prepared in a concentration of 30–50% by weight. Optionally, the resulting solution or dispersion may be diluted with a solvent such as methanol, at elevated temperature, if required, to a solids content of, for instance, 10% by weight. Then usually a bluish dispersion of the stabilizer is obtained which has an average particle size of 100–250 μm (determined by dynamic light scattering). The polybutadiene part of the stabilizer is insoluble in the dispersion agent used, but is stabilized by copolymer grafted onto the polybutadiene, which copolymer is solvated, however, by the dispersing agent.

According to the invention 40–100% of the carboxylic acid groups from the acrylic acid and/or methacrylic acid and/or the amino groups from the amino group-containing acrylic and/or methacrylic ester are ionised by adding 0,5–1,5, preferably 0,8–1,3 equivalents of an ionizing agent per equivalent of carboxylic acid group or amino group. As examples of suitable ionizing agents for the carboxylic acid may be mentioned ammonia and amines, such as N,N-dimethyl ethanolamine, N,N-diethyl ethanolamine, triethylamine and morpholine. Examples of suitable ionizing agents for the amino groups include acids such as boric acid and phosphoric acid and carboxylic acids such as acetic acid, propionic acid, lactic acid, tartaric acid, malic acid and citric acid. It is preferred that the carboxylic acid groups and/or amino groups should be ionized after preparation of the stabilizer.

Optionally, the stabilizer according to the invention, prepared in an ester group-containing alcohol, may after ionization be further diluted with water. In the process of carrying out the polymerization reaction for the preparation of the aqueous dispersion of the addition polymer it is preferred that the monomeric compound(s) should be added slowly to a dispersion of the stabilizer in water, so that no relatively high monomer concentrations will form in the reaction medium. Adding the monomer over a period of ½ to 4 hours will result in a stable polymer dispersion, without making use of an alcohol as (additional) solvent. With this embodiment it is preferred that the initiator should be a mixture of a peroxide, such as tert. butyl hydroperoxide, and a reducing agent such as ascorbic acid.

The aqueous dispersions of the addition polymer according to the invention may also contain the usual additives and adjuvants, such as pigments, dispersing agents, dyes, solvents and accelerators for the curing reaction. The pigments may by of an acid, neutral or basic nature and they may be organic or inorganic. Optionally, the pigments may have been pretreated for modifying their properties. As examples of suitable pigments may be mentioned: titanium dioxide, iron oxide, carbon black and phthalocyanin pigments. Also metal pigments based on, for instance, aluminium and stainless steel may be used.

Curing the coats obtained by using the dispersions according to the present invention may be carried out by physical drying. Alternatively, however, the coats may be cured if the addition polymer and/or the stabilizer in the dispersed particles contain hydroxyl groups and the aqueous dispersion contains a curing agent reacting with hydroxyl groups. As examples of suitable curing agents may be mentioned N-methylol groups- and/or N-methylol ether groups-containing amino resins obtained by reacting an aldehyde, such as formaldehyde, with an amino or amido groups-containing compound such as melamine, urea, N,N'-ethylene urea, dicyanodiamide and benzoguanamine. The resulting compounds are preferably entirely or partly etherified with alcohols having 1 to 6 carbon atoms, such as methanol, ethanol, n-propanol, isopropanol, n-butanol, isobutanol, amyl alcohol, hexanol or mixtures thereof. Particularly favourable results may be obtained by using a methylol melamine having 4–6 methylol groups per molecule of melamine, at least 3 methylol groups being etherified with butanol, or a butanol etherified condensation product of formaldehyde and N,N'-ethylene diurea. Other suitable curing agents are, for instance, water-dispersible, blocked polyisocyanates. The above-envisaged curing agents are generally applied in an amount such that the molar ratio of the hydroxyl groups of the dispersion to the reactive groups of the curing agent is in the range of 0,7 to 1,5, preferably 0,9 to 1,1.

The dispersions according to the invention may be applied to a substrate in any desirable manner, such as by roller coating, spraying, brushing, sprinkling, flow coating, dipping, electrostatic spraying or electrophoresis. As suitable substrates may be mentioned wood, metal and synthetic material. Curing may be carried out at ambient temperature after evaporation of the solvent or at higher temperatures in the range of, for instance, 60° to 160° C., in a baking oven and over a period of 10 to 60 minutes.

The acrylate dispersions according to the invention form a rapidly drying glossy coat on wood, metal and synthetic material. They are extremely suitable for use on wood as a clear lacquer and give a transparent coat which imparts a high glow and gloss to the wood. Applied to wood, the coat is tack-free and dust-dry after 15-30 minutes at room temperature. After about 1 week's drying at room temperature its resistance to water and alcohol is very good. The appearance of the coat on wood is comparable with that obtained with a conventional nitrocellulose lacquer, which is often used in the furniture industry, and which contains about 80% by weight of organic solvent, which creates atmospheric pollution and a fire hazard. Use there of the water-dilutable dispersions according to the invention is therefore of great advantage.

The acrylate dispersions according to the invention are also extremely suitable for applying metallic coating compositions containing a so-called non-leafing aluminium paste in order to obtain a coat having a metallic appearance. These metal pigments are especially used in the automobile industry in order to obtain so-called high gloss metallics. Then the difficulty is to obtain both an attractive metallic appearance and a high gloss. For a proper metallic effect the aluminum pigment should be well fixed during spraying of the coating composition. In order that a high gloss may be obtained the aluminium pigment-containing coat is sprayed with a clear (unpigmented) coat. This dual coat system is referred to as base-coat/clear-coat system. The composition of the clear-coat is generally based on an organic solvent.

To prevent the aluminium pigment-containing base-coat from being unduly softened, which is attended with loss of the metallic effect, use is generally made in a base-coat system of cellulose acetobutyrate. This additive, however, has the great disadvantage that in order to make it possible for the composition to be sprayed it should be diluted with a large proportion of organic solvent. Conventional base-coat systems generally contain 80-90% of organic solvent. Use of the water-dilutable dispersions according to the invention as base-coat composition offers the advantage of a strong reduction of atmospheric pollution.

Particularly suitable for this use are water-dilutable dispersions according to the invention which are so prepared that in the monomer composition there is used a small proportion of the above-mentioned polyunsaturated monomers, as a result of which the polymer micro particles are entirely or partly cross-linked. This results in a highly improved resistance of the coat to organic solvents. In this way the base-coat is prevented from being unduly softened by the clear-coat, so that loss of the metallic effect can be avoided.

The water-dilutable dispersions according to the invention can be used as a binder in an aqueous metallic base-coat, optionally in combination with a water-soluble polymer. In combination with a base-coat based on the dispersion according to the invention the clear-coat used may for instance be a baking lacquer of a conventional acrylate/melamine composition. This system is cured in a baking oven for 20-30 minutes at a temperature of 130°-150° C. Also a clear-coat can be applied, for instance a so-called two-component system based on an acrylate/polyisocyanate composition which is cured in a baking oven for 20-30 minutes at a temperature of 60°-80° C. Even after curing at low temperature the total base-coat/clear-coat system displays excellent resistance to water, which is often a great problem in the case of water-dilutable systems.

The invention will be further described in the following examples, which must not be construed as limiting the scope of the present invention. The Persoz hardness mentioned in them was determined in accordance with the French Industrial Standard NV T30-016 and is expressed in seconds. An acceptable minimum value for automobile paint is about 200 seconds. For wood lacquer an acceptable minimum value is about 30 seconds. And for use as parquet lacquer a minimum value of about 80 seconds is considered acceptable. The gloss was determined in accordance with ASTM D-523 at 60° and 20°. A gloss value for a steel substrate of over 90 at 60° is accepted as a high value; the same applies to a gloss value of over 75 at 20°. In the case of a wooden substrate a gloss value of 20 at 60° and a gloss value of 5 at 20° are accepted as high values. The mean particle size was determined by dynamic light scattering, the dispersion being diluted with methanol to a solids content of about 0,1% by weight. The hydroxyl number is expressed in mg KOH/g. The viscosity was determined with a Brookfield viscometer. The polymer dispersions obtained according to the Examples 1-21 all had a bluish appearance.

EXAMPLE A

In a 3-liter three-necked flask fitted with a stirrer, a reflux condenser and a thermometer there were homogeneously mixed:

190,0 g of polybutadiene having a number average molecular weight of 3500, composed of 20-25% of vinyl-1,2, 40-45% of trans-1,4 and 30-40% of cis-1,4 polybutadiene 104,0 g of styrene 86,0 g of methacrylic acid 9,5 g of dibenzoyl peroxide (80% in water) and 579,5 g of isopropoxy propanol-2 and after deaeration brought under a nitrogen atmosphere. The mixture was subsequently heated to 90° C., at which temperature it was kept for 6 hours. On conclusion of the reaction a dispersion was obtained having a solids content of 40% by weight in isopropoxy 2-propanol, to which 969,0 g of methanol were slowly added, with stirring. The resulting stabilizer A dispersion had a bluish appearance, a solids content of 20% by weight and an average particle size of 115 nm.

EXAMPLE B

Example A was repeated, except that use was made of a hydroxy functionalized polybutadiene having a hydroxyl number of 46,6, a number average molecular weight of 2800 and compared of 20% vinyl-1,2, 60% trans-1,4 and 20% cis-1,4-butadiene as polybutadiene. The resulting stabilizer B dispersion had a solids content of 40% by weight in isopropoxy 2-propanol, which was further diluted with methanol to a solids content of 20% by weight. The resulting stabilizer B dispersion had an average particle size of 157 nm.

EXAMPLE C

Example A was repeated, except that use was made of 581,4 g of diethylene glycol monobutyl ether instead of the isopropoxy propanol-2. The resulting dispersion of stabilizer C had an average particle size of 200 nm.

EXAMPLE D

Example A was repeated, except that use was made of 581,4 g of diethylene glycol monobutyl ether instead of the isopropoxy propanol-2. The resulting stabilizer D had an average particle size of 245 nm.

EXAMPLE E

Example A was repeated, except that use was made of 581,4 g of dipropylene glycol monomethyl ether instead of the isopropoxy propanol-2. The resulting stabilizer E dispersion had an average particle size of 131 nm.

EXAMPLE F

Example A was repeated, except that use was made of the following components and amounts:
- 152,0 g of the polybutadiene of Example B
- 63,2 g of styrene
- 68,8 g of methacrylic acid
- 7,6 g of dibenzoyl peroxide (80% in water) and
- 433,6 g of isopropoxy propanol-2.

On conclusion of the polymerization reaction the resulting stabilizer F dispersion in isopropoxy propanol-2 had a solids content of 40% by weight and was further diluted with methanol to a solids content of 20% by weight.

EXAMPLE G

Example B was repeated, except that use was made of the following components and amounts:
- 193,5 g of the polybutadiene
- 104,0 g of styrene
- 64,5 g of methacrylic acid
- 25,0 g of methyl methacrylate
- 11,0 g of dibenzoyl peroxide (70% by weight in water)
- 588,7 g of isopropoxy propanol-2.

The resulting stabilizer G dispersion in isopropoxy propanol-2 had a solids content of 40.0% of weight and an average particle size of 125 nm.

EXAMPLE H

In a 2-liter four-necked flask equipped with a stirrer, a reflux condenser, a thermometer and a dropping funnel there were homogeneously mixed:
- 102,7 g of polybutadiene of Example B
- 52,0 g of styrene
- 27,95 g of methacrylic acid
- 22,75 g of 2-hydroxyethyl methacrylate
- 8,8 g of dibenzoyl peroxide (70% in water) and
- 567,2 g of isopropoxy propanol-2.

The dropping funnel was filled with a homogeneous mixture of:
- 102,7 g of polybutadiene of Example B
- 52,0 g of styrene
- 27,95 g of methacrylic acid
- 22,75 g of 2-hydroxyethyl methacrylate
- 8,8 g of dibenzoyl peroxide (70% in water).

Following deaeration the contents of both the reaction flask and the dropping funnel were brought under a nitrogen atmosphere and the contents of the reaction flask were heated to a temperature of 90° C. Over a period of 30 minutes the contents of the dropping funnel were discharged into the reaction flask, whose contents were maintained at a temperature of 90° C. After the entire contents had been added to the reaction flask, its temperature was kept at 90° C. for 6 hours. Ths stabilizer H dispersion obtained after cooling to room temperature had a solids content of 42,5% by weight and an average particle size of 105 nm.

EXAMPLE 1

To 250 g of the 20% by weight stabilizer A dispersion in a 2-liter three-necked flask fitted with a stirrer, a reflux condenser, a thermometer and a dropping funnel were successively added dropwise, with stirring, the following components:
- 492,0 g of methanol
- 7,0 g of N,N-dimethyl ethanolamine
- 411,0 g of demineralized water
- 200,0 g of a monomer mixture consisting of 0,2 moles of butyl acrylate, 0,3 moles of methyl methacrylate and 0,5 moles of butyl methacrylate.

The reaction mixture there were added 4,0 g of azo-bisisobutyronitrile. After deaeration the reaction mixture was brought under an atmosphere of nitrogen and heated to reflux temperature (about 73° C.), at which temperature it was kept for 6 hours. On conclusion of the reaction the reaction product was diluted with demineralized water and the methanol distilled off with the aid of a rotating film evaporator.

The resulting polymer dispersion, which had been filtered using a 10 μm filter, had the following properties:
- solids content: 30% by weight
- viscosity: 1,2 Pa.s
- average particle size: 200 nm
- pH: 8,0

EXAMPLE 2

Example 1 was repeated, except that use was made of 8,3 g of ammonia containing 26,8% by weight of $NH_3$, instead of the N,N-dimethyl ethanolamine. The resulting polymer dispersion had the following properties:
- solids content: 38% by weight
- viscosity: 1,4 Pa.s
- average particle size: 250 nm
- pH: 7,9

EXAMPLE 3

Example 1 was repeated, except that use was made of 200 g of a monomer mixture consisting of:
- 0,15 moles of butyl acrylate
- 0,30 moles of methyl methacrylate
- 0,50 moles of butyl methacrylate
- 0,05 moles of 2-hydroxypropyl acrylate and 9,25 g instead of 7,0 g of the N,N-dimethyl ethanolamine.

The resulting polymer dispersion had the following properties:
- solids content: 25% by weight
- viscosity: 1,75 Pa.s
- average particle size: 185 nm
- pH: 8,0

EXAMPLE 4

Example 1 was repeated, except that use was made of 200 g of a monomer mixture consisting of:
- 0,10 moles of butylacrylate 0,10 moles of 2-hydroxyethylacrylate
0,30 moles of methyl methacrylate
0,50 moles of butyl methacrylate and 9,25 g instead of 7,0 g of the N,N-dimethyl ethanolamine.

The resulting polymer dispersion had the following properties:
solids content: 27% by weight
viscosity: 3,9 Pa.s
average particle size: 204 nm
pH: 8,4

EXAMPLE 5

Example 1 was repeated, except that use was made of 20 g of a 40% by weight suspension in water of dilauroyl peroxide instead of the azobisisobutyronitrile.

The resulting polymer dispersion had the following properties:
solids content: 30% by weight
viscosity: 1,4 Pa.s
average particle size: 195 nm
pH: 8,0

EXAMPLE 6

Example 1 was repeated, except that use was made of 250 g of the 20% by weight dispersion of stabilizer B instead of that of stabilizer A and of 9,25 g instead of 7,0 g of the N,N-dimethyl ethanolamine.

The resulting dispersion had the following properties:
solids content: 27% by weight
viscosity: 1,48 Pa.s
average solids content: 123 nm
pH: 8,1

EXAMPLE 7

Example 4 was repeated, except that use was made of 250 g of the 20% by weight dispersion of stabilizer B instead of that of stabilizer A and of 9,25 g instead of 7,0 g of the N,N-dimethyl ethanolamine.

The resulting polymer dispersion had the following properties:
solids content: 28% by weight
viscosity: 1,23 Pa.s
average particle size: 125 nm
pH: 8,3

EXAMPLE 8

Example 3 was repeated, except that use was made of 196 g of the monomer mixture and of 4 g of trimethylol propane triacrylate instead of said 200 g of the monomer mixture.

The resulting polymer dispersion had the following properties:
solids content: 25% by weight
viscosity: 1,8 Pa.s
average particle size: 190 nm
pH: 8,0

EXAMPLE 9

Example 1 was repeated, except that use was made of 250 g of the 20% by weight dispersion of stabilizer C instead of that of stabilizer A, of 8,7 g of ammonia, containing 25,4% by weight of $NH_3$, instead of the N,N-dimethyl ethanolamine and a monomer mixture consisting of:
0,1 mole of butyl acrylate
0,4 moles of methyl methacrylate
0,5 moles of butyl methacrylate The resulting polymer dispersion had the following properties:
solids content: 35% by weight
viscosity: 0,6 Pa.s
average particle size: 212 nm
pH: 7,8

EXAMPLE 10

Example 9 was repeated, except that use was made of 250 g of the 20% by weight dispersion of stabilizer D instead of that of stabilizer C.

The resulting polymer dispersion had the following properties:
solids content: 35% by weight
viscosity: 0,46 Pa.s
average particle size: 158 nm
pH: 7,8

EXAMPLE 11

Example 9 was repeated, except that use was made of a monomer mixture consisting of:
0,1 mole of 2 ethylhexyl acrylate
0,4 moles of methyl methacrylate
0,5 moles of butyl methacrylate The resulting polymer dispersion has the following properties:
solids content: 37,5% by weight
viscosity: 1,5 Pa.s
average particle size: 190 nm
pH: 7,8

EXAMPLE 12

Example 11 was repeated, except that use was made of 250 g of the 20% by weight dispersion of stabilizer D instead of that of stabilizer C.

The resulting polymer dispersion had the following properties:
solids content: 37% by weight
viscosity: 1,05 Pa.s
average particle size: 135 nm
pH: 7,8

EXAMPLE 13

Example 11 was repeated, except that use was made of 250 g of the 20% by weight dispersion of stabilizer E instead of that of stabilizer C.

The resulting polymer dispersion had the following properties:
solids content: 35% by weight
viscosity: 1,6 Pa.s
average particle size: 171 nm
pH: 8,1

EXAMPLE 14

Example 9 was repeated, except that use was made of a monomer mixture consisting of:
0,3 moles of 2-ethylhexyl acrylate
0,2 moles of methyl methacrylate
0,3 moles of butyl methacrylate
0,2 moles of styrene The resulting polymer dispersion had the following properties:
solids content: 38% by weight
viscosity: 1,7 Pa.s average particle size: 250 nm
pH: 7,8

EXAMPLE 15

Example 1 was repeated, except that use was made of the following components and amounts:
- 250,0 g of the 20% by weight dispersion of stabilizer F
- 390,0 g of methanol
- 9,8 g of N,N-dimethyl ethanolamine
- 511,0 g of demineralized water
- 200,0 g of a monomer mixture consisting of:
  - 0,25 moles of butyl acrylate
  - 0,55 moles of methyl methacrylate
  - 1,0 mole of butyl methacrylate
  - 0,1 mole of dimethylaminoethyl methacrylate
  - 0,1 mole of 2-hydroxypropyl acrylate
- 4,0 g of azobisisobutyronitrile.

On conclusion of the polymerization reaction the reaction product was further diluted with water and the methanol was distilled off with the aid of a rotating film evaporator.

The resulting polymer dispersion had the following properties:
- solids content: 25% by weight
- viscosity: 1,74 Pa.s
- average particle size: 105 nm
- pH: 8,1

EXAMPLE 16

Example 15 was repeated, except that use was made of:
- 185,0 g of a monomer mixture of Example 3 and
- 15,0 g of trimethylol propane triacrylate instead of the aforementioned 200,0 g of the monomer mixture.

The resulting polymer dispersion had the following properties:
- solids content: 24% by weight
- viscosity: 1,55 Pa.s
- average particle size: 160 nm
- pH: 8,1

EXAMPLE 17

Example 1 was repeated, except that use was of the following components and amounts:
- 125,0 g of the 40% by weight dispersion of stabilizer G
- 619,0 g of methanol
- 11,0 g of N,N-dimethyl ethanolamine
- 407,0 g of diemineralized water
- 200,0 g of the monomer mixture of Example 16
- 4,0 g of azobisisobutyronitrile.

On conclusion of the polymerization reaction the reaction product was further diluted with water and the methanol as distilled off with the aid of a rotating film evaporator.

The resulting polymer dispersion had the following properties:
- solids content: 29% by weight
- viscosity: 0,5 Pa.s
- average particle size: 120 nm

EXAMPLE 18

To 125 g of the 40% by weight dispersion of stabilizer B contained in a 2-liter 5-necked flask equipped with a stirrer, a reflux condenser, a thermometer and 2 dropping funnels were successively added dropwise, with stirring, the follong components:
- a mixture of 11,0 g of N,N-dimethyl ethanolamine and 11,0 g of demineralized water,
- 253,0 g of demineralized water.

To this aqueous dispersion of stabilizer B were added 2 g of ascorbic acid. Subsequently, the one dropping funnel was filled with 200 g of the monomer mixture of Example 16 and the other dropping funnel with a mixture of 666 g of demineralized water and 2,0 g of tert.butyl hydroperoxide. After deaeration the contents of both the reaction flask and the two dropping funnels were brought under an atmosphere of nitrogen and the contents of the reaction flask were heated to a temperature of 50° C. Over a period of two hours the two dropping funnels were simultaneously emptied into the reaction flask, with its contents being maintained at a temperature of 50° C. Subsequently, the temperature of the reaction flask was kept at 50° C. for 2 hours.

The resulting polymer dispersion had the following properties:
- solids content: 20% by weight
- viscosity: 1,05 Pa.s
- average particle size: 150 nm

EXAMPLE 19

Example 18 was repeated, except that use was made of stabilizer G instead of stabilizer B, of 75 g instead of 253,0 g of demineralized water, of 0,5 g instead of 2,0 g of ascorbic acid, and of 417,5 g instead of 666 g of demineralized water.

The resulting polymer dispersion had the following properties:
- solids content: 30% by weight
- viscosity: 1,02 Pa.s
- average particle size: 155 nm.

EXAMPLE 20

Example 19 was repeated, except that instead of 11,5 g of dimethyl ethanolamine there were added 8,5 g and instead of 11,0 g of demineralized water there were added 8,5 g and instead of 75 g of demineralized water there were added 204,5 g. Further, as monomer mixture there was used a mixture of 186 g of butyl acrylate and 14 g of trimethylol propane triacrylate and the other dropping funnel was filled with 290 g of demineralized water and 1,5 g of butyl hydroperoxide.

The resulting polymer dispersion had the following properties:
- solids content: 30% by weight
- viscosity: 0,49 Pa.s
- average particle size: 175 nm

EXAMPLE 21

To 264,75 g of the 42,5% by weight dispersion of stabilizer H in a 3-liter 5-necked flask equipped with a stirrer, a reflux condenser, a thermometer and 2 dropping funnels there were successively added dropwise, with stirring, the following components:
- a mixture of 15,4 g N,N-dimethyl ethanomine and 15,4 g of demineralized water,
- 574,35 g of demineralized water.

To this aqueous dispersion of stabilizer H were added 1,4 g of tert. butyl hydroperoxide.

Subsequently, the one dropping funnel was filled with 262,5 g of a monomer mixture consisting of:
0,575 moles of butyl methacrylate
0,05 moles of 2-hydroxypropyl methacrylate
0,075 moles of methyl methacrylate
0,3 moles of butyl acrylate and
7% by weight of trimethylol propane triacrylate and the other dropping funnel was filled with a mxture of 262,5 g of demineralized water and 0,825 g of ascorbic acid. After deaeration the contents of both the reaction flask and the two dropping funnels were brought under a nitrogen atmosphere and the contents of the reaction flask were heated to a temperature of 55° C. Over a period of 1 hour the two dropping funnels were simultaneously emptied into the reaction flask with its contents being maintained at a temperature of 55° C. Subsequently, the temperature of the reaction flask was kept at 55° C. for 1 hour.

The resulting polymer dispersion had the following properties:
solids content: 27% by weight
viscosity: 0,27 Pa.s
average particle size: 125 nm
pH: 8,5

EXAMPLE 22

Of the polymer dispersion of Example 3 an amount of 223 g was mixed with 10 g of non-leafing aluminum paste (available under the trade name Silberline type ET543) and diluted with 152 g of demineralized water.

The viscosity of the resulting coating composition was 30 sec. in Ford cup No 4. The coating composition was sprayed onto a steel test panel (Bonder 130) to a thickness of 15 μm (in the dried state). The resulting coat with a metallic appearance was re-sprayed with a clear baking lacquer of a conventional acrylate/melamine coating composition.

After curing in a baking oven for 30 minutes at 140° C. a metallic coat having a high gloss was obtained which displays excellent resistance both to organic solvents and water.

EXAMPLE 23

Example 22 was repeated, except that use was made of 223 g of the polymer dispersion of Example 8 instead of 223 g of the polymer dispersion of Example 3.

The resulting coat with a metallic appearance was re-sprayed with a clear baking lacquer of conventional so-called bicomponent acrylate/polyisocyanate coating composition.

After curing in a baking oven for 30 minutes at 80° C. a metallic coat with a high gloss was obtained which displays excellent resistance both to organic solvents and water.

EXAMPLE 24

A polymer dispersion of Example 10 was applied to a mahogany test panel by brush. After three hours' drying at room temperature the test panel was slightly rubbed with sand paper (fineness grade P320), after which a second coat was applied by brush.

In this way a transparent film was formed on the wood, which displayed a high flow and gloss.

After one week's drying at room temperature the coat showed excellent resistance to alcohol and water. Measured after 1 week, the physical properties of the coat were as follows:

gloss at 60°: 50
gloss at 20°: 15
Persoz hardness: 105

EXAMPLE 25

Of the polymer dispersion of Example 13 an amount of 50 g was mixed with 11,7 g of titanium dioxide and 100 mg of a pigment dispersing agent (available under the trade mark Disperbyk). This mixture together with 75 g of glass beads was shaken for 15 minutes. The mixture was diluted with 37 g of demineralized water, after which the glass beads were filtered off. The resulting coating composition had a solids content of 44% by weight.

The coating composition was applied in the same way as given in Example 24 both to a mahogany test panel and to a steel test panel (Bonder 130) to a thickness (in the dried state) of 30 μm and 40 μm, respectively. After one week's drying at room temperature both the coat on wood and on metal showed excellent resistance to alcohol and water.

Measured after 1 week, the physical properties of the coats were:

|  | Coats on | |
| --- | --- | --- |
|  | wood | metal |
| gloss at 60° | 60 | 85 |
| gloss at 20° | 15 | 65 |
| Persoz hardness | 100 | 150 |

I claim:
1. An aqueous dispersion comprising
   (a) an addition polymer prepared from an acrylate monomer and/or methacrylate monomer; and
   (b) 5–100 weight percent (based on the addition polymer) of a dispersion stabilizer obtained by the copolymerization of
      (i) 100 weight parts of a mixture of
         (1) 20–75 mole % of
            (A) styrene and/or
            (B) methyl styrene;
         (2) 21–60 mole % of
            (A) acrylic acid,
            (B) methacrylic acid, and/or
            (C) an amino group-containing
               (a) acrylic and/or
               (b) methacrylic ester; and
         (3) 0–40 mole % of a different monoethylenically saturated compound;
      in the presence of
      (ii) 40–200 weight parts of polybutadiene prepared from at least 60 weight % of 1,3-butadiene and having a molecular weight of 1500–10,000;
   at least a portion of the carboxylic acid groups of the (2) (A) acrylic acid and/or (2) (B) methacrylic acid, and/or a portion of the amino groups of the amino group-containing (2)(C)(a) acrylic and/or (2)(C)(b) methacrylic ester being ionized.

2. The aqueous dispersion of claim 1, wherein said polybutadiene is prepared from at least 80 weight % of 1,3-butadiene.

3. The aqueous dispersion of claim 1, wherein said polybutadiene has a number average molecular weight of 2200–6000.

4. The aqueous dispersion of claim 1, wherein the dispersion stabilizer is obtained by copolymerization of
   (i) 100 parts by weight of a mixture of (1) 35–65 mole % of styrene and/or methyl styrene,
(2) 25–55 mole % of acrylic acid, methacrylic acid, and/or an amino group-containing acrylic and-/or methacrylic ester, and
(3) 0–40 mole % of a different monoethylenically unsaturated compound;
in the presence of
(ii) 40–200 parts by weight of said polybutadiene.

5. The aqueous dispersion of claim 4, wherein the dispersion stabilizer is obtained by copolymerization of
(i) 100 parts by weight of a mixture of
(1) 45–55 mole % of styrene and/or methyl styrene,
(2) 30–50 mole % of acrylic acid, methacrylic acid, and/or an amino group-containing acrylic and-/or methacrylic ester, and
(3) 0–40 mole % of a different monoethylenically unsaturated compound;
in the presence of
(ii) 40–200 parts by weight of said polybutadiene.

6. The aqueous dispersion of claim 5, wherein the amino group-containing ester is a dialkylamino (meth)acrylate of which the alkyl groups have 1–4 carbon atoms.

7. The aqueous dispersion of claim 1, further comprising a curing agent for reacting with hydroxyl groups.

8. The dispersion of claim 1, wherein the addition polymer is prepared from a sufficient amount of a polyunsaturated monomer to induce partial or complete cross-linking of the polymer micro particles.

9. A coating composition comprising the dispersion of claim 1 and a pigment.

10. The coating composition of claim 9, wherein the addition polymer is prepared from a sufficient amount of a polyunsaturated monomer to induce partial or complete cross-linking of the polymer micro particles.

11. The coating composition of claim 8, wherein the pigment is present in an amount so as to render the coating composition (in the cured state) opaque.

12. The coating composition of claim 11, wherein the pigment is metal pigment.

13. The coating composition of claim 12, wherein the pigment is aluminum.

14. The coating composition of claim 13, wherein the aluminum pigment is non-leaving aluminum paste.

* * * * *